United States Patent
Patti et al.

(10) Patent No.: US 9,785,182 B2
(45) Date of Patent: Oct. 10, 2017

(54) INTEGRATED ELECTRONIC DEVICE INCLUDING A TEMPERATURE TRANSDUCER

(71) Applicant: STMicroelectronics S.R.L., Agrate Brianza (IT)

(72) Inventors: Davide Giuseppe Patti, Mascalucia (IT); Lorenzo Maurizio Selgi, Fiumefreddo di Sicilia (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 14/970,999

(22) Filed: Dec. 16, 2015

(65) Prior Publication Data
US 2016/0313755 A1 Oct. 27, 2016

(30) Foreign Application Priority Data
Apr. 23, 2015 (IT) .................. 102015000012876

(51) Int. Cl.
*G05F 5/00* (2006.01)
*G01K 7/01* (2006.01)

(52) U.S. Cl.
CPC ........ *G05F 5/00* (2013.01); *G01K 7/01* (2013.01)

(58) Field of Classification Search
CPC . G05F 1/44; G05F 1/613; G05F 3/262; G05F 3/16; G05F 3/50; G01K 3/14; G01K 7/01; G01K 7/028

USPC .......................... 327/108, 109, 110, 111, 112
See application file for complete search history.

(56) References Cited

U.S. PATENT DOCUMENTS

| | | | |
|---|---|---|---|
| 2006/0214704 A1* | 9/2006 | Nakano | H03K 5/08 327/110 |
| 2006/0244496 A1* | 11/2006 | Kawakita | F02P 3/0552 327/110 |
| 2013/0257329 A1 | 10/2013 | Orou et al. | |

FOREIGN PATENT DOCUMENTS

DE    10 2013 105 439 A1    12/2014

OTHER PUBLICATIONS

De Souza, M. et al., "Thin-Film Lateral SOI PIN Diodes for Thermal Sensing Reaching the Cryogenic Regime," Journal Integrated Circuits and Systems 5(2):160-167, 2010.

* cited by examiner

*Primary Examiner* — John Poos
(74) *Attorney, Agent, or Firm* — Seed Intellectual Property Law Group LLP

(57) ABSTRACT

An integrated electronic device includes an electronic component and a temperature transducer. The temperature transducer is electrically arranged between a control terminal and a conduction terminal of the electronic component and includes a first diode. The first diode has a bulk resistance of at least 1 k$\Omega$.

23 Claims, 5 Drawing Sheets

INTEGRATED ELECTRONIC DEVICE INCLUDING A TEMPERATURE TRANSDUCER

BACKGROUND

Technical Field

The present disclosure relates to an integrated electronic device including a temperature transducer.

Description of the Related Art

As is known, there currently exist integrated electronic devices that each include an electronic component and at least one temperature transducer, which enables detection of the temperature in a point of the integrated electronic device. In this way, during use of the electronic component it is possible to determine whether it is necessary to implement strategies that will prevent damage to the integrated electronic device.

For instance, illustrated in FIG. 1 are a temperature transducer 1 and an electronic component 3, which form an integrated electronic device 6; for example, the electronic component 3 is a power MOSFET.

The temperature transducer 1 includes a diode 2, which is formed within a die 5, formed inside which is the integrated electronic device 6.

The diode 2 may be of polysilicon. For instance, as illustrated in FIG. 2, the die 5 includes an epitaxial region 8, for example of an N type, extending on which is a body region 10, for example of a P type. Extending on the body region 10 is a dielectric region 12, made, for example, of thermal oxide. This having been said, the diode 2 is formed by an anode region 16, made precisely of polysilicon and with doping of a P+ type, and a cathode region 18, of polysilicon and with doping of an N+ type. The anode region 16 and the cathode region 18 extend on the dielectric region 12. A top region 20, made, for example, of a phosphosilicate glass, extends on the dielectric region 12 and part of the diode 2. An anode metallization 22 and a cathode metallization 24 extend through the top region 20 for contacting the anode region 16 and the cathode region 18, respectively.

As illustrated in FIG. 1, the anode region 16 and the cathode region 18 are electrically connected, respectively, to a first pad 30 and a second pad 32 of conductive material. Furthermore, the diode 2 is arranged within the active area 37 of the electronic component 3, i.e., in a central area of the die 5. By way of example, FIG. 1 further shows a so-called gate pad 41 of the electronic component 3, as well as the so-called "gate fingers" 43. Further, the electrical connections between the diode 2 and the first and second pads 30, 32 are illustrated qualitatively.

In use, the first and second pads 30, 32 are electrically connected to a controller (not illustrated) designed to inject a current I into the first pad 30. The controller is thus designed to forward bias the diode 2. Further, the controller collects the current I on the second pad 32. In addition, albeit not illustrated, the controller is electrically coupled to the diode 2 so as to detect a voltage $V_{F1}$ across the diode 2. Assuming that the diode 2 operates in the proximity of its threshold voltage, the voltage $V_{F1}$ decreases approximately by 2 mV per degree centigrade.

Since the voltage $V_{F1}$ depends upon the temperature of the diode 2, the controller may detect onset of situations that are potentially dangerous for operation of the integrated electronic device 6, on the basis of the voltage $V_{F1}$. In particular, assuming, for example, that the integrated electronic device 6 is short-circuited, there occurs a fast increase in temperature of the diode 2, which may be detected by the controller, on the basis of the voltage $V_{F1}$. Once an anomalous condition of use of the electronic component 3 has been detected, the controller may co-operate with the driving circuit (not illustrated) of the electronic component 3 in order to implement a technique of protection of the electronic component 3; for example, it is possible for the electronic component 3 to be turned off.

In this connection, FIG. 3 shows some examples of plots of the forward voltage across the diode 2, as the temperature varies, on the hypothesis of injection into the diode 2 of three different values of forward current. Further illustrated in FIG. 3 are a temperature threshold, an allowed operating region and a forbidden operating region for one of the three values of forward current.

In practice, the temperature transducer 1 transduces a temperature into a voltage to enable monitoring of the temperature. However, the temperature transducer 1 requires two additional pads with respect to the pads necessary for driving the electronic component 3. Consequently, the temperature transducer 1 entails a certain consumption of area of the die 5.

BRIEF SUMMARY

In one embodiment, the present disclosure provides an integrated electronic device including an electronic component and a temperature transducer. The temperature transducer is electrically arranged between a control terminal and a conduction terminal of the electronic component and includes a first diode. The first diode has a bulk resistance of at least 1 kΩ.

In another embodiment, the present disclosure provides an electronic system that includes an electronic device including an electronic component and a temperature transducer. The temperature transducer includes a first diode, and is electrically arranged between a control terminal and a conduction terminal of the electronic component. A control module is configured to forward bias the first diode, and the first diode is configured to operate in a substantially linear region of a current-to-voltage characteristic curve for the first diode when said electronic component is in a conduction mode.

In an embodiment, the present disclosure provides a method, the method including: providing an electronic device including an electronic component and a temperature transducer, the temperature transducer having a first terminal electrically coupled to a control terminal of the electronic component and a second terminal electrically coupled to a conduction terminal of the electronic component and including a first diode; and forward biasing, by a control module, said first diode to operate in a substantially linear region of a current-to-voltage characteristic curve for the first diode.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein.

DETAILED DESCRIPTION

Figure 1:
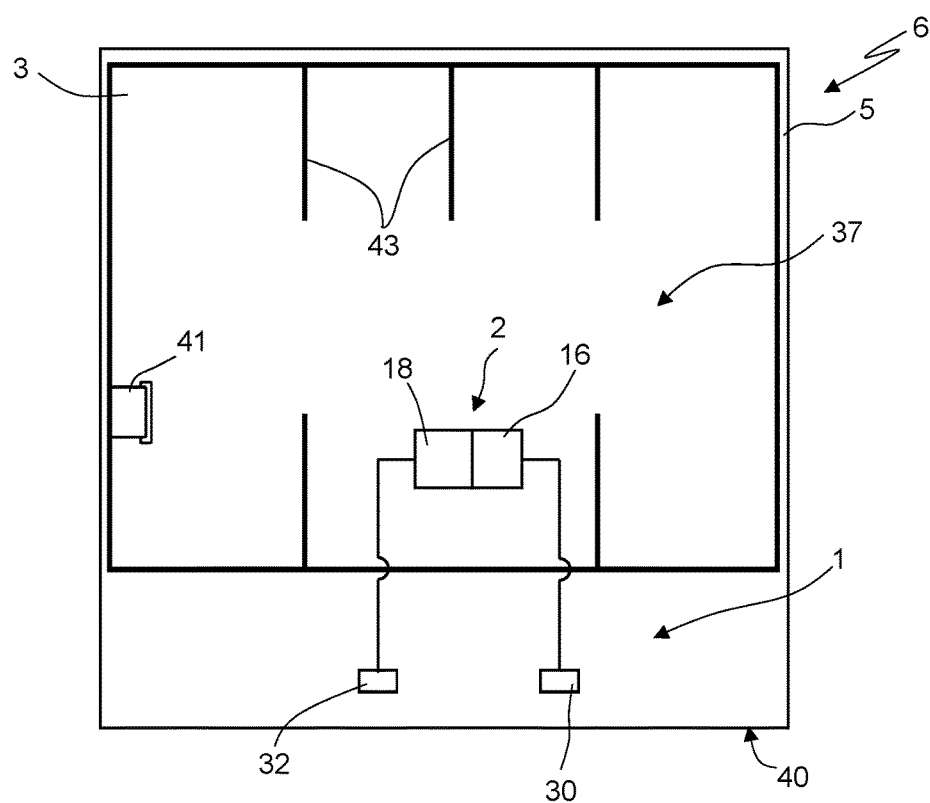
FIG. 1 is a schematic top plan view, with portions removed, of a die.
Figure 2:
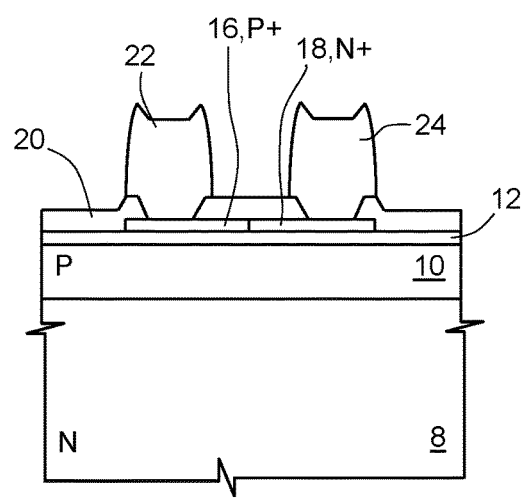
FIG. 2 shows schematically a cross section of a portion of the die illustrated in FIG. 1.
Figure 3:
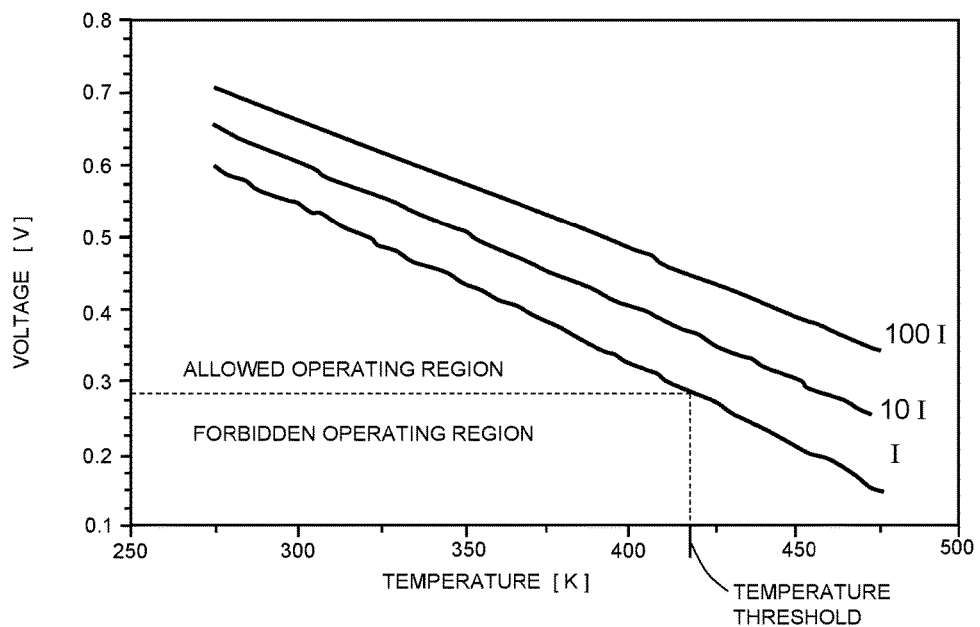
FIG. 3 shows plots, as the temperature varies, of the forward voltage across a current-driven diode, for three different current values.
Figure 4:
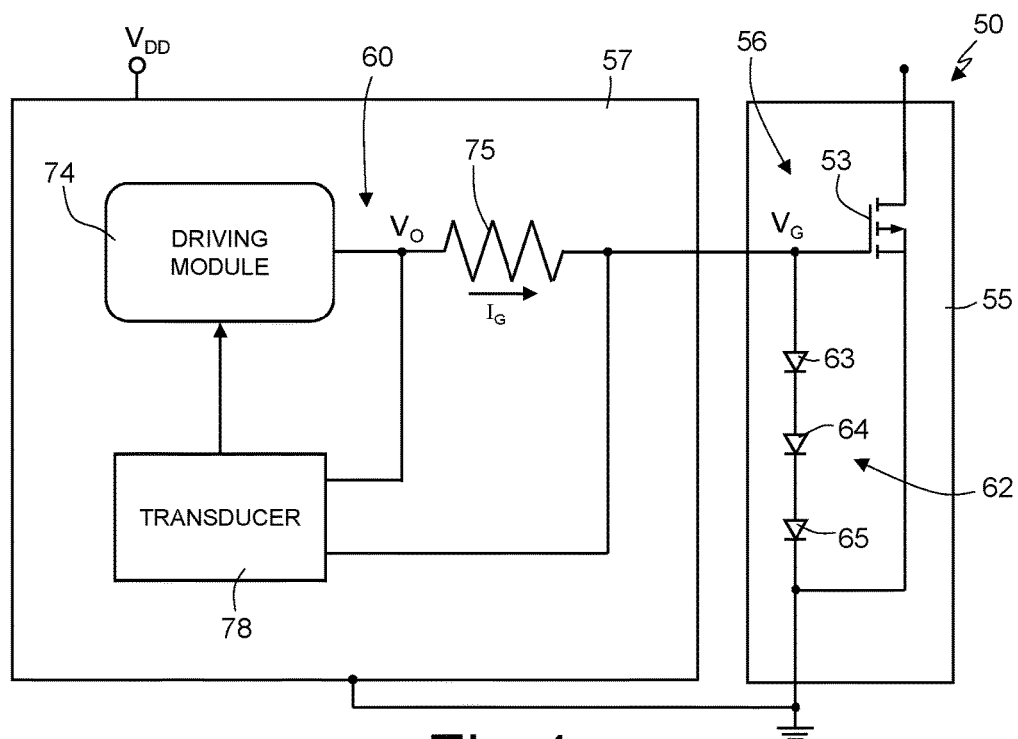
FIG. 4 shows a block diagram of an electronic system, in one embodiment.

FIG. 4 shows an electronic system 50, which includes an integrated electronic device 56, which in turn comprises an electronic component 53 and a temperature transducer 62. Without any loss of generality, the electronic component 53 is a power PMOS transistor. Further illustrated schematically in FIG. 4 are a first die 55, formed inside which is the integrated electronic device 56, and a second die 57. The electronic system 50 further comprises a control module 60, formed in the second die 57.

The temperature transducer 62 comprises at least one diode. Without any loss of generality, in the embodiment illustrated in FIG. 4 the temperature transducer 62 comprises a first diode 63, a second diode 64, and a third diode 65, connected in series. In detail, the anode of the first diode 63 is connected to the gate terminal of the electronic component 53, whereas the cathode of the first diode 63 is connected to the anode of the second diode 64, the cathode of which is connected to the anode of the third diode 65. The cathode of the third diode 65 is connected to ground. Without any loss of generality, also the source terminal of the electronic component 53 is connected to ground, whereas the drain terminal may be connected to a load (not illustrated). Once again without any loss of generality, the first and second dice 55, 57 share a same ground.

The first, second, and third diodes 63, 64, 65 may be electrically insulated from the rest of the first die 55, and in particular from the other semiconductor portions of the first die 55. For instance, each of the first, second, and third diodes 63, 64, 65 may be formed by a respective anode region and by a respective cathode region (not illustrated), with P and N doping, respectively, of polysilicon and arranged above a dielectric region (not illustrated) of the first die 55, with which they are in direct contact. Further, each of these diodes may be partially overlaid, in direct contact, by a top region (not illustrated) made, for example, of a phosphosilicate glass.

With regard to the control module 60, it comprises a driving module 74, which has an input and an output. Furthermore, the control module 60 comprises a resistor 75, which is connected between the output of the driving module 74 and the gate terminal of the electronic component 53.

The control module 60 further comprises a voltage transducer 78, which has a first input and a second input and an output. The first and second inputs of the voltage transducer 78 are connected across the resistor 75 and have an impedance that is to a first approximation infinite. The output of the voltage transducer 78 is connected to the input of the driving module 74. Although not illustrated, the driving module 74 is further connected to a supply terminal set at a supply voltage $V_{DD}$.

In what follows, operation of the electronic system 50 is described with reference to a range of temperatures comprised between a temperature $T_{min}$, which corresponds, for example, to the temperature envisaged for use of the integrated electronic device 56, and a temperature $T_{max}$, equal to the maximum temperature allowed for the integrated electronic device 56. Furthermore, in what follows it is assumed, for simplicity, that the first, second, and third diodes 63, 64, 65 are the same as one another and are at a same temperature, equal to the temperature of the electronic component 53. It is further assumed, for simplicity, that the integrated electronic device 56 is all at a same temperature.

In addition, in what follows reference is made to a normal operating condition of the electronic component 53, where the electronic component 53 is in conduction at the aforementioned temperature $T_{min}$. In this connection, without any loss of generality, it is further assumed that, in the aforementioned normal operating condition, the voltage present on the gate terminal of the electronic component 53 is higher than the threshold voltage of the electronic component 53.

In detail, the electronic system 50 is such that, at the temperature $T_{min}$, each of the first, second, and third diodes 63, 64, 65 operates in a region in which the respective current-to-voltage characteristic curve has a linear profile, determined by the value of the so-called bulk resistance, as described in greater detail hereinafter. In this region, the so-called dynamic resistance coincides, to a first approximation, with the bulk resistance. Furthermore, the bulk resistance of each of the first, second, and third diodes 63, 64, 65 is at least 1 kΩ, preferably 100 kΩ. Variants are further possible in which the bulk resistance of each of the first, second, and third diodes 63, 64, 65 is at least 300 kΩ. In addition, the bulk resistances of the first, second, and third diodes 63, 64, 65 are such that the series circuit formed by them has a resistance $R_{tot}$ such that, when the electronic component 53 is in the aforementioned normal operating condition, in the temperature transducer 62 there flows a limited current $I_F$, for example not higher than 10 μA. The resistance $R_{tot}$ is equal to the sum of the bulk resistances of the first, second, and third diodes 63, 64, 65.

In practice, if $V_G$ is the voltage present on the gate terminal of the electronic component 53, the number and type of the diodes that form the temperature transducer 62 are such that, when the voltage $V_G$ is equal to the threshold voltage of the electronic component 53, and simultaneously the electronic component 53 is at the aforementioned temperature $T_{min}$, the current $I_F$ is to a first approximation negligible.

The driving module 74 is configured to generate on its own output a constant voltage $V_O$. Consequently, the resistor 75 is subjected to the voltage $V_O$-$V_G$ and is traversed by a current $I_G$. In the so-called turning-on period of the electronic component 53, i.e., in the period in which the so-called Miller capacitance of the electronic component 53 is charged, the current $I_G$ is higher than the current $I_F$. Once the Miller capacitance is charged, the current $I_G$ is equal to the current $I_F$. This having been said, it is assumed that, if $R_{75}$ is the resistance of the resistor 75, the resistance $R_{75}$ is negligible with respect to the resistance $R_{tot}$ of the temperature transducer 62; for example, it is assumed that is $R_{75} < 0.1 \cdot R_{tot}$. Furthermore, in what follows we assume that we are referring to instants in time in which the current $I_G$ is equal to the current $I_F$, except where otherwise specified.

Figure 5:
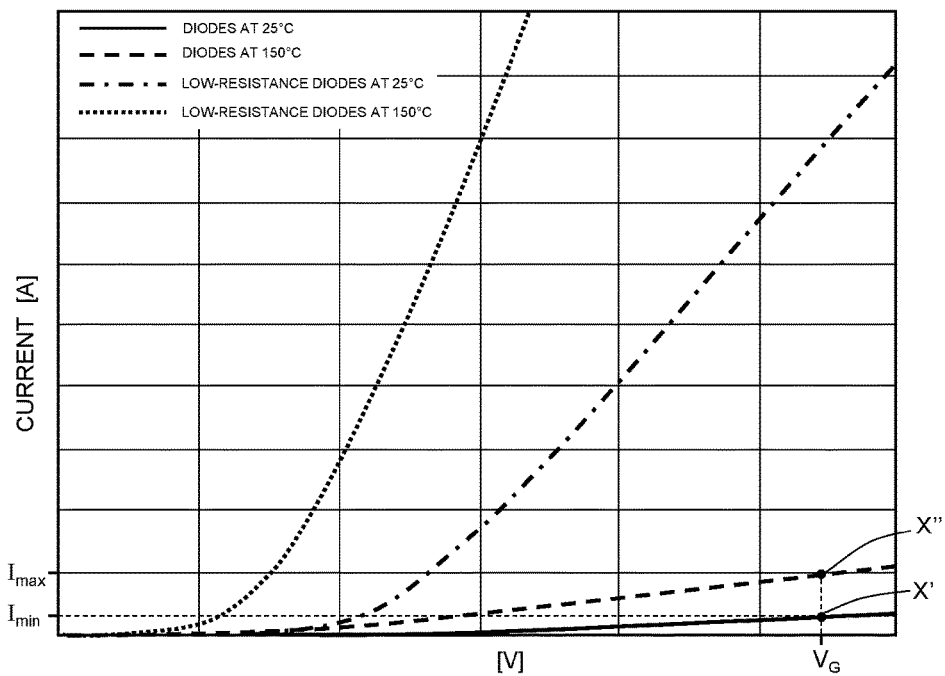
FIGS. 5, 6 and 7 show the plots of current-to-voltage characteristic curves for circuits including diodes, in accordance with one or more embodiments.
Figure 6:
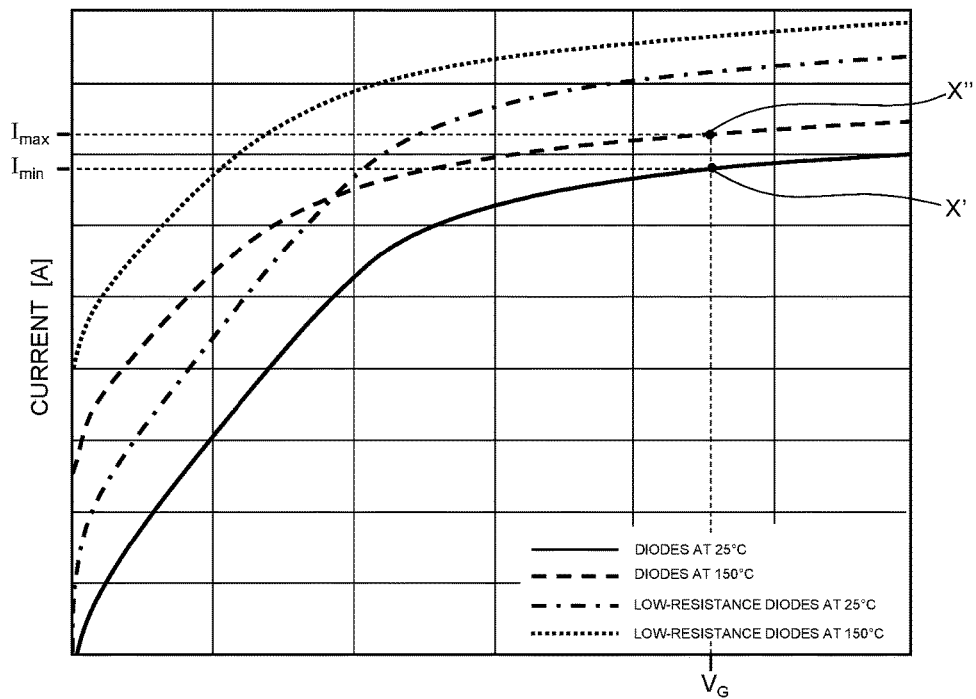

In detail, the electronic system 50 is such that, when the electronic component 53 is in the aforementioned normal operating condition, the temperature transducer 62 operates in an operating point X' of its current-to-voltage characteristic curve in which the curve itself has a linear profile, with a slope that depends upon the resistance $R_{tot}$. In other words, the operating point X' has abscissa equal to the aforementioned voltage $V_G$ and is beyond the so-called knee of the current-to-voltage characteristic curve, this knee being characterized by an exponential profile. In this connection, each of FIGS. 5 and 6 shows current-to-voltage characteristic curves for the series circuit formed by the temperature transducer 62. Further, whereas the ordinates of FIG. 5 are in linear scale, the ordinates of FIG. 6 are in logarithmic scale. In particular, represented in each of FIGS. 5 and 6 are:

- a first curve (solid line) regarding the temperature transducer 62, when set at the temperature $T_{min}=25°$ C.;
- a second curve (dashed line), regarding the temperature transducer 62, when set at the temperature $T_{max}=125°$ C.;
- a third curve (dashed-and-dotted line) regarding a hypothetical transducer formed by diodes with low series resistance (for example, 100Ω), when set at the temperature $T_{min}=25°$ C.; and
- a fourth curve (dotted line) again regarding the aforementioned hypothetical transducer, when set at the temperature $T_{max}=150°$ C.

Figure 7:
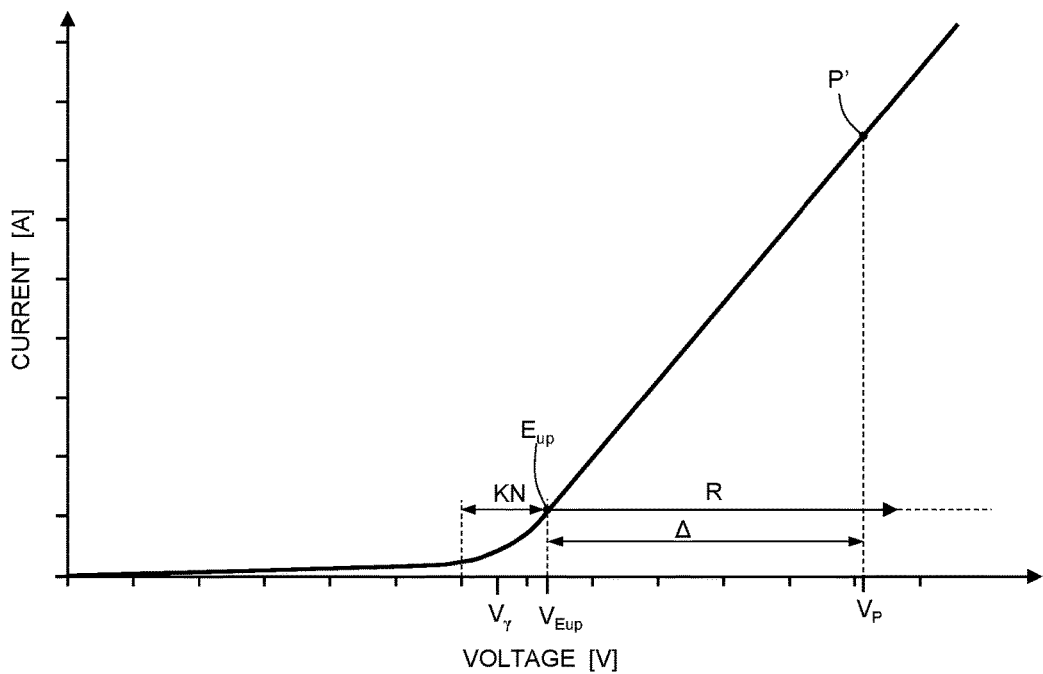

Purely in a qualitative way, FIG. 7 shows at an enlarged scale a current-to-voltage characteristic curve regarding any one of the first, second, and third diodes 63, 64, 65, when set at the temperature $T_{min}=25°$ C. Without any loss of generality, in what follows it is assumed that FIG. 7 refers to the first diode 63. In this connection, the voltage $V_G$ present globally on the temperature transducer 62 divides into equal parts on each of the first, second, and third diodes 63, 64, 65, which are traversed by a same current and thus operate in the same operating conditions. Furthermore, the current-to-voltage characteristic curves of each of the first, second, and third diodes 63, 64, 65, in addition to being the same as one another, have the same profile as the current-to-voltage characteristic curve of the temperature transducer 62, but for a scale factor.

This having been said, FIG. 7 highlights a knee region KN, where the current-to-voltage characteristic curve of the first diode 63 has an exponential profile, and a subsequent rectilinear region R, where the curve has a linear profile, with angular coefficient that depends upon the bulk resistance of the first diode 63. For completeness, FIG. 7 also shows the threshold voltage of the diode, designated by $V_\gamma$, above which conduction occurs. FIG. 7 further shows the operating point of the first diode (designated by P'), which corresponds to a current $I_{min}$ and to a voltage $V_P$. In these conditions, we have $I_F=I_{min}$, which may assume a value of the order, for example, of microamperes.

In even greater detail, the operating point P' of the first diode 63 is located at a distance Δ from a point $E_{up}$, which represents the upper limit of the knee KN; i.e., it represents the highest voltage value for which the current-to-voltage characteristic curve of the first diode 63 may be approximated with the ideal exponential curve of the diode. From a quantitative standpoint, the point $E_{up}$ indicates the voltage value beyond which the incremental ratio of the current becomes approximately constant (for example, with a tolerance of 3%). This having been said, if $V_{Eup}$ is the voltage corresponding to the point $E_{up}$, the distance Δ is equal to $k \cdot V_{Eup}$, where k is for example equal to 2, preferably 5, even more preferably 10.

Once again with reference to the embodiment illustrated in FIG. 4, from the first and second curves appearing in FIGS. 5 and 6 it may be noted how, upon passage from the temperature $T_{min}$ to the temperature $T_{max}$, there occurs a variation of the current-to-voltage characteristic curve of the temperature transducer 62. Furthermore, to a first approximation it may be assumed that the voltage across each of the first, second, and third diodes 63, 64, 65, and thus also the voltage $V_G$ on the gate terminal of the electronic component 53, remains substantially constant as the temperature varies.

This assumption is justified by the fact that the resistance $R_{75}$ is negligible with respect to the resistance $R_{tot}$.

In greater detail, at the temperature $T_{max}$, each of the first, second, and third diodes 63, 64, 65 operates in a new operating point P''' (not illustrated), the abscissa of which, to a first approximation, is once again equal to the voltage $V_P$. Furthermore, the temperature transducer 62 operates in an operating point X''' of its current-to-voltage characteristic curve. The operating point X''' corresponds to a current $I_{max}$ and has an abscissa that is once again equal, to a first approximation, to the voltage $V_G$. In these conditions, we thus have $I_F=I_{max}$, which may assume a value of the order, for example, of hundreds of microamperes. In any case, also the value of the current $I_{max}$ is compatible with the current supply capacity of the driving module 74.

It may further be shown that the operating point P''' of each diode and the operating point X''' of the temperature transducer 62 always fall within the linear regions of the respective current-to-voltage characteristic curves, and further are at a distance from the respective knees greater than the distances present at the temperature $T_{min}$.

In practice, when the electronic component 53 is in conduction and is at a temperature comprised between $T_{min}$ and $T_{max}$, the voltage across the temperature transducer 62, and thus on the gate terminal 53 of the electronic component, is not equal to the sum of the threshold voltages $V_\gamma$ of the first, second, and third diodes 63, 64, 65, but rather is higher than this sum.

This having been said, the voltage transducer 78 is configured to detect the voltage present across the resistor 75. In particular, the voltage transducer 78 is designed to supply to the driving module 74 a control signal, which indicates the difference between the aforementioned voltage $V_O$ and the aforementioned voltage $V_G$. The control signal thus indicates the current $I_G$ (and consequently the current $I_F$), to which it is directly proportional, since the value of resistance of the resistor 75 is known.

The driving module 74 stores the law of variation of the current $I_F$ that flows in the temperature transducer 62 as the temperature varies, and as a function of the voltage applied across the temperature transducer 62. For this purpose, the driving module 74 may, for example, be provided with a memory (not illustrated) in which a "look-up table" is stored. Furthermore, the driving module 74 determines an estimate of the current $I_F$, on the basis of the control signal. In greater detail, the driving module 74 reads the control signal, after the so-called Miller capacitance of the electronic component 53 has been charged, and determines an estimate I* of the current $I_F$ that flows in the temperature transducer 62. Next, the driving module 74 determines an estimate T* of the temperature at which the temperature transducer 62 is, on the basis of the aforementioned law of variation of the current $I_F$, of the estimate I* of the current $I_F$, and of the aforementioned voltage $V_G$ across the temperature transducer 62, the latter voltage being substantially constant as the temperature varies, as explained previously. In this connection, since, for any value of temperature comprised between the temperature $T_{min}$ and the temperature $T_{max}$, each of the first, second, and third diodes 63, 64, 65 operates in an operating point that falls in the linear region of the corresponding current-to-voltage characteristic curve, the calculations made by the driving module 74 are simplified.

Optionally, the driving module 74 may compare the estimate T* of the temperature with the aforementioned temperature $T_{max}$. If the estimate T* of the temperature is higher than or equal to the temperature $T_{max}$, the driving module 74 may implement a technique of protection of the integrated electronic device 56, for example by turning off the electronic component 53.

In practice, the resistor 75 enables detection of the variations of the current $I_F$ caused by temperature variations. Additionally, the resistor 75 enables detection of the change of impedance of the temperature transducer 62, caused by the increase in temperature, which is first transduced into a current variation, and subsequently into a voltage variation. Different embodiments are, however, possible, as illustrated, for example, in FIG. 8.

Figure 8:
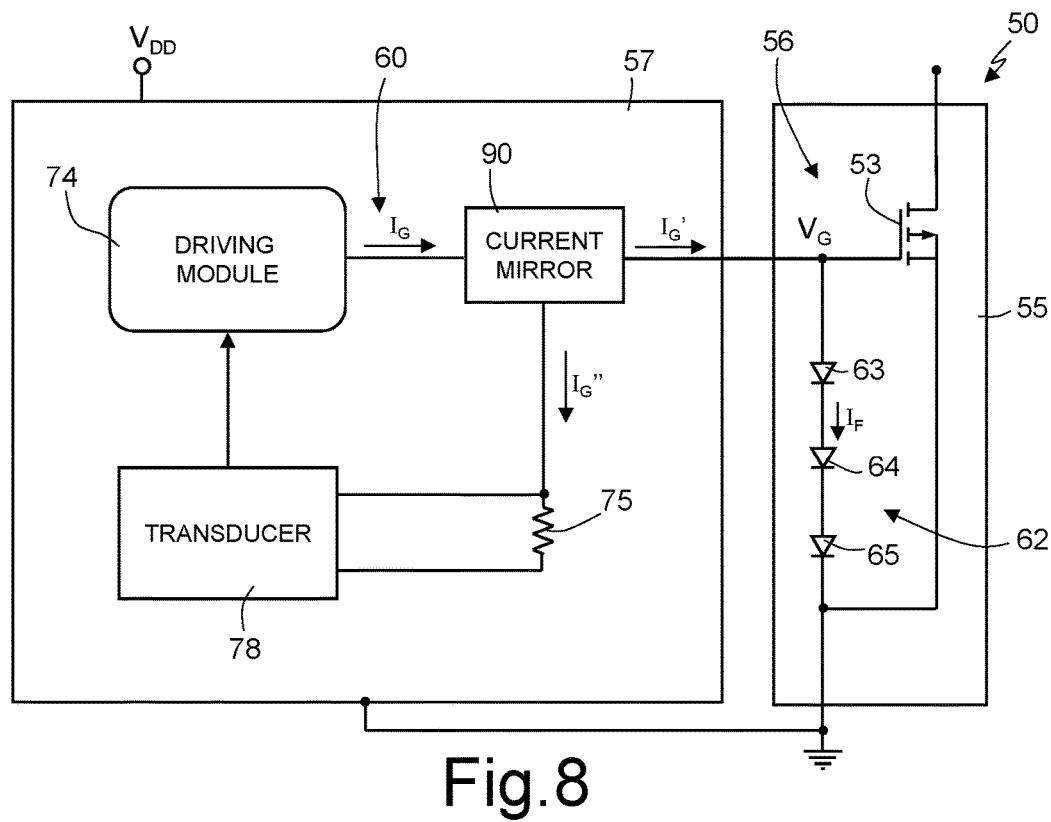
FIGS. 8-10 are block diagrams of electronic systems, in accordance with one or more embodiments.

In detail, in the embodiment illustrated in FIG. 8, the control module 60 comprises a current mirror 90, of a per se known type. Further, the resistor 75 is arranged between the first and second inputs of the voltage transducer 78.

In greater detail, the current mirror 90 has an input, connected to the output of the driving module 74, and a first output and a second output, connected, respectively, to the gate terminal of the electronic component 53 and to the first input of the voltage transducer (i.e., to a terminal of the resistor 75).

In use, on the input of the current mirror 90 the current $I_G$ is present, whereas on the first and second outputs of the current mirror 90 a current $I_G'$ and a current $I_G''$ are, respectively, present. The current mirror 90 is of a per se known type and is such that the currents $I_G$, $I_G'$, and $I_G''$ are substantially the same. Further, after the Miller capacitance has been charged, the current $I_F$ is equal to the current $I_G'$.

In practice, the control signal generated by the voltage transducer 78 is proportional to the current $I_G''$, and thus to the current $I_F$, when the Miller capacitance is charged. The driving module 74 thus determines the estimate I* of the current $I_F$ on the basis of the current $I_G''$.

The embodiment illustrated in FIG. 8 enables detection of the variations of the current $I_F$ in the temperature transducer 62, without varying the voltage present on the gate terminal of the electronic component.

From what has been described and illustrated previously, the advantages that the present solution affords emerge clearly.

In particular, the integrated electronic device 56 integrates the electronic component 53 together with the temperature transducer 62, without requiring any further pads with respect to those of the electronic component 53.

The integrated electronic device 56 further enables entire assignment to the control module 60 of the possible implementation of protection techniques, thus guaranteeing a high flexibility of the electronic system 50, unlike what occurs in the case of self-protected devices of a known type. In this connection, self-protected devices of a known type are characterized in that they act by modifying the signal present on the gate terminal of the electronic component and thus reducing the state of conduction of the electronic component, irrespective of the value of the driving signal, until the electronic component turns off.

In conclusion, it is clear that modifications and variations may be made to what has been described and illustrated herein, without thereby departing from the scope of the present disclosure, as defined in the annexed claims.

Figure 9:
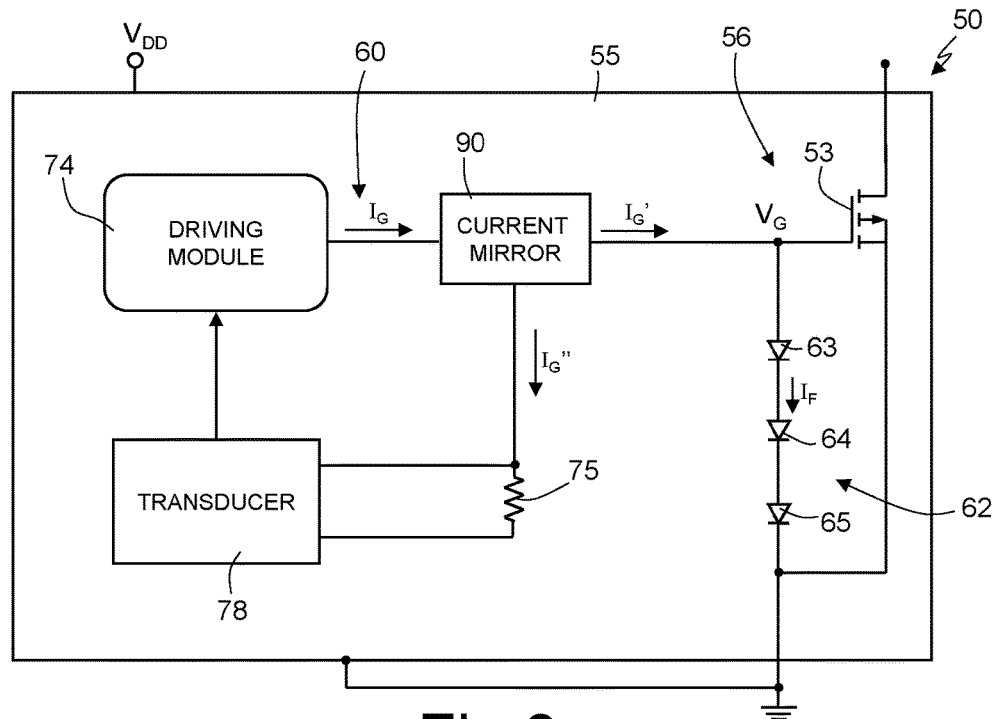

For instance, with regard to the control module 60, parts thereof may be formed in different dice, instead of in a single die. Furthermore, it is possible for the control module 60 to be formed in the first die 55, in which case the second die 57 may be absent, as illustrated in FIG. 9, where, purely by way of example, an embodiment including the current mirror 90 is illustrated.

With regard to the temperature transducer 62, it may include a different number of diodes and/or diodes that are different from one another. In general, the temperature transducer includes at least one diode having a bulk resistance of at least 1 kΩ, preferably 100 kΩ. Further possible are variants in which this diode has a bulk resistance of at least 300 kΩ. A higher number of diodes enables in any case an increase of the sensitivity in regard to the temperature variations. Furthermore, it is possible for one or more diodes of the temperature transducer, provided that it is not all of them, to operate in the proximity of the corresponding threshold voltage, thus for example in an operating point that falls within the knee of the current-to-voltage characteristic curve.

Figure 10:
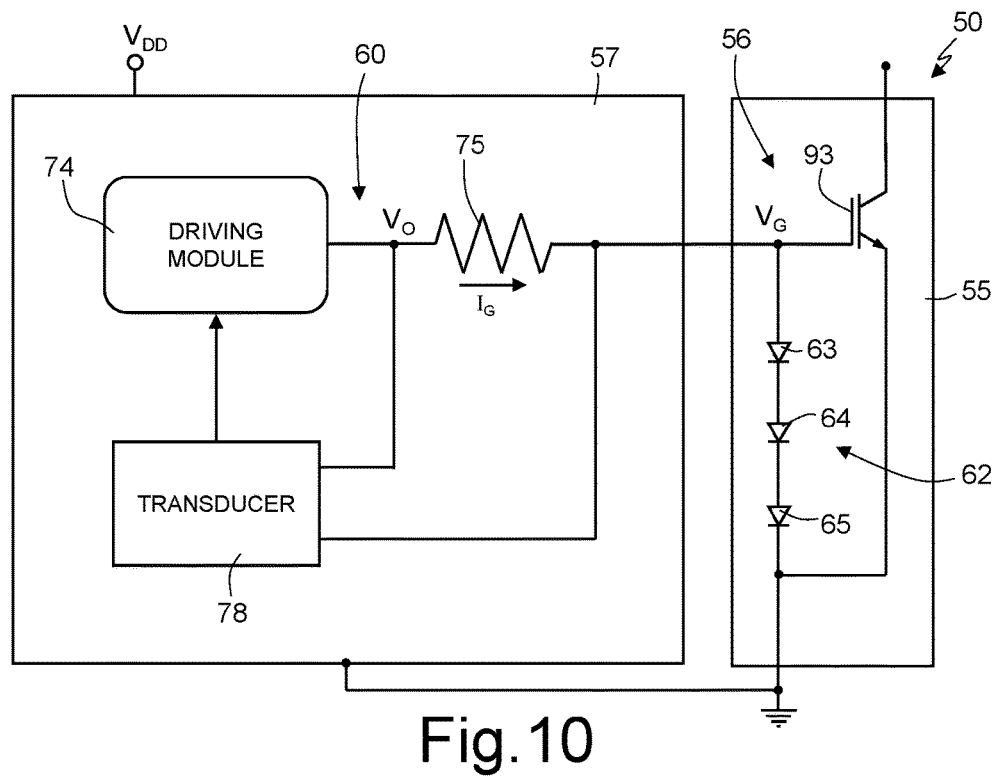

Finally, as mentioned previously, the electronic component 53 may be other than a power MOS transistor. Purely by way of example, the electronic component 53 may be formed, for example, by a JFET, or by an IGBT. For instance, FIG. 10 shows an embodiment in which the electronic component, designated by 93, is formed by an IGBT. In this case, the temperature transducer 62 is arranged between the gate terminal and the emitter terminal of the electronic component 93.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated electronic device, comprising:
an electronic component having a control terminal and a conduction terminal;
a temperature transducer, including:
a first terminal coupled to the control terminal of the electronic component and configured to receive a voltage at the control terminal;
a second terminal coupled to the conduction terminal of the electronic component; and
a first diode having a bulk resistance of at least 1 kΩ, and
an estimator unit coupled to the temperature transducer, the estimator unit estimates a temperature of the electronic component based on a current through the temperature transducer.

2. The electronic device according to claim 1, wherein the bulk resistance of said first diode is at least 100 kΩ.

3. The electronic device according to claim 1, wherein said temperature transducer includes a second diode, coupled in series to the first diode.

4. The electronic device according to claim 1, wherein the electronic component and the temperature transducer are formed in a same die.

5. The electronic device according to claim 1, wherein the electronic component comprises at least one of: a power MOS transistor, a junction gate field-effect transistor (JFET) and an insulated-gate bipolar transistor (IGBT).

6. An electronic system comprising:
an electronic device including:
an electronic component; and
a temperature transducer that includes a first diode, the temperature transducer being electrically arranged between a control terminal and a conduction terminal of the electronic component, the first diode including a first terminal coupled to the control terminal of the electronic component and configured to receive a voltage at the control terminal; and a control module configured to forward bias said first diode, said first diode being configured to operate in a substantially linear region of a current-to-voltage characteristic curve for the first diode when said electronic component is in a conduction mode, the control module including a current transducer that generates a signal indicative of a current in the temperature transducer.

7. An electronic system comprising:
an electronic device including:
an electronic component; and
a temperature transducer that includes a first diode, the temperature transducer being electrically arranged between a control terminal and a conduction terminal of the electronic component, the first diode including a first terminal coupled to the control terminal of the electronic component and configured to receive a voltage at the control terminal; and
a control module configured to forward bias said first diode, said first diode being configured to operate in a substantially linear region of a current-to-voltage characteristic curve for the first diode when said electronic component is in a conduction mode, wherein said first diode is configured to operate at a point of the current-to-voltage characteristic curve having a corresponding voltage that is greater than a voltage ($V_{Eup}$) corresponding to an upper limit of a knee of said current-to-voltage characteristic curve by $2 \cdot V_{Eup}$.

8. The electronic system according to claim 6, the control module further comprising:
a driving module configured to apply a voltage to the control terminal of the electronic component; and
an estimator unit configured to estimate a temperature of the electronic component.

9. The electronic system according to claim 8, wherein the estimator unit includes a look-up table storing information indicative of a relationship between the current in the temperature transducer, temperature, and a voltage across the temperature transducer, and the estimate unit is configured to estimate the temperature of the electronic component based on the information stored in the look-up table.

10. The electronic system according to claim 8, wherein said control module comprises a current mirror having an input terminal electrically coupled to an output of the driving module, a first output terminal electrically coupled to the control terminal of the electronic component and a second output terminal electrically coupled to an input terminal of the current transducer, the current mirror being configured to generate, based on a received output of the driving module, a first mirrored current at the first output terminal and a second mirrored current at the second output terminal, wherein the current transducer is configured to generate the signal indicative of a current in the temperature transducer based on the second mirrored current.

11. The electronic system according to claim 8, wherein the driving module is further configured to control the electronic component based on said estimate of the temperature of the electronic component.

12. The electronic system according to claim 6, wherein the electronic device and the control module are formed in a single die.

13. A method, comprising:
providing an electronic device including an electronic component and a temperature transducer, the temperature transducer having a first terminal electrically coupled to a control terminal of the electronic component and configured to receive a voltage at the control terminal, and a second terminal electrically coupled to a conduction terminal of the electronic component, the temperature transducer including a first diode;
forward biasing, by a control module, said first diode to operate in a substantially linear region of a current-to-voltage characteristic curve for the first diode; and
generating, by a current transducer in the control module, a signal indicative of a current in the temperature transducer.

14. The method according to claim 13, further comprising:
operating said first diode at a point of the current-to-voltage characteristic curve having a corresponding voltage that is greater than a voltage ($V_{Eup}$) corresponding to an upper limit of a knee of said current-to-voltage characteristic curve by $2 \cdot V_{Eup}$.

15. The method according to claim 13, further comprising:
storing information indicative of a relationship between the current in the temperature transducer, temperature, and a voltage across the temperature transducer;
applying a voltage, by a driving module, to the control terminal of the electronic component; and
receiving said signal indicative of a current in the temperature transducer; and
estimating a temperature of the electronic component, based on said stored information.

16. The method according to claim 15, wherein the information indicative of a relationship between the current in the temperature transducer, temperature, and a voltage across the temperature transducer is stored in a look-up table.

17. The method according to claim 15, wherein said control module comprises a current mirror having an input terminal electrically coupled to an output of the driving module, a first output terminal electrically coupled to the control terminal of the electronic component and a second output terminal electrically coupled to an input terminal of the current transducer, the method further comprising:
generating by the current mirror, based on a received output of the driving module, a first mirrored current at the first output terminal and a second mirrored current at the second output terminal, wherein the current transducer is configured to generate the signal indicative of a current in the temperature transducer based on the second mirrored current.

18. The method according to claim 15, further comprising:
controlling, by the driving module, the electronic component based on said estimate of the temperature of the electronic component.

19. An integrated electronic device, comprising:
an electronic component having a control terminal and a conduction terminal;
a temperature transducer, said temperature transducer being electrically arranged between the control terminal and the conduction terminal of the electronic component and including a first diode having a bulk resistance of at least 1 kΩ; and
a control module, the control module including:
a driving module configured to apply a voltage to the control terminal of the electronic component; and
an estimator unit configured to estimate a temperature of the electronic component.

20. The integrated electronic device of claim 19 wherein the estimator unit includes a look-up table storing information indicative of a relationship between the current in the temperature transducer, temperature, and a voltage across the temperature transducer, and the estimate unit is configured to estimate the temperature of the electronic component based on the information stored in the look-up table.

21. The integrated electronic device of claim 19 wherein the driving module is further configured to control the electronic component based on said estimate of the temperature of the electronic component.

22. The electronic system according to claim 7, the control module further comprising:
   a driving module that applies a voltage to the control terminal of the electronic component; and
   an estimator unit that estimates a temperature of the electronic component.

23. The electronic system according to claim 22, wherein the driving module controls the electronic component based on the estimate of the temperature of the electronic component.

* * * * *